United States Patent [19]

Kennedy

[11] 4,415,897

[45] Nov. 15, 1983

[54] PRECISION CONTROL OF RF ATTENUATORS FOR STC APPLICATIONS

[75] Inventor: Henry R. Kennedy, Los Angeles, Calif.

[73] Assignee: International Telephone and Telegraph Corporation, New York, N.Y.

[21] Appl. No.: 265,957

[22] Filed: May 21, 1981

[51] Int. Cl.³ .............................................. G01S 7/34
[52] U.S. Cl. .................................. 343/5 SM; 367/900
[58] Field of Search .............. 343/5 SM, 7 A, 7 AG, 343/5 DP, 5 R (U.S. only); 333/81 R; 455/249, 455/254; 367/900

[56] References Cited

U.S. PATENT DOCUMENTS

| | | |
|---|---|---|
| 3,765,020 | 10/1973 | Seager et al. ................... 343/5 SM |
| 4,053,870 | 10/1977 | Noe ............................... 333/81 R X |
| 4,106,872 | 8/1978 | Soderstrom ............................ 356/4 |
| 4,228,435 | 10/1980 | Nevin ................................ 343/5 SM |

Primary Examiner—Maynard R. Wilbur
Assistant Examiner—Robert C. Burk
Attorney, Agent, or Firm—T. E. Kristofferson; W. T. O'Neil

[57] ABSTRACT

Two STC configurations for precision control of RF attenuators, each configuration utilizing a log-scale electronic attenuator, are disclosed. The first configuration includes a D/A converter/linear-to-log module combination to provide a log range ramp; the second configuration utilizes a log table ROM/D-A converter to provide a precision log range ramp, the range so generated controlling the log-scale electronic attenuator utilized in the radio frequency receiver.

19 Claims, 4 Drawing Figures

PRECISION CONTROL OF RF ATTENUATORS FOR STC APPLICATIONS

BACKGROUND OF THE INVENTION

As is known in the prior art, it is desirable to cyclically modulate the gain of the receiver of a pulsed radar system. In such a system the power associated with the radio frequency echoes from a target varies inversely with the fourth power of the range (inversely with the fourth power of the two-way propagation time of the radar energy). Commonly such radar systems employ sensitivity-time control (STC) in the receiver thereof. Without an STC, a mixer, IF or RF amplifier of the receiver would require an extremely wide dynamic range for processing signals having a large variation in signal strength as an inverse function of range. The STC reduces the dynamic range requirement of the mixer or amplifier by varying the gain (i.e. sensitivity) of the receiver, ideally as the fourth power of the propagation time of the radar energy, that is, in inverse relationship to the reduction in power associated with received echo signals from increasing ranges.

Prior art STC's may use an analog attenuator, typically comprised of pin diodes synchronized with each one of the transmitted pulses. The gain of such attenuator increases in accordance with the fourth power of the time interval after each one of such transmitted pulses. Some disadvantages such as signal distortion, drift, and poor reliability are associated with analog attenuators.

While a digitally controlled attenuator does not have the inherent disadvantages of the analog attenuator, prior art digital attenuators using field effect transistors may not be able to operate satisfactorily with radio frequency signals (that is of frequencies in a typical 2-4 GHZ range). Because of their relatively high switching speed, radio frequency signals can couple through an "off" FET because of its inherent interelectrode capacitance, and thereby prevent accurate control of the desired attenuation factor for the attenuator. Further, where a ladder network is used in the digital attenuator and portions of the radio frequency signals are coupled into selected shunt elements of the ladder network, the relative phase shift between signals passing through different selected shunt elements may have significant effect on accurately establishing a desired attenuation factor for the digital attenuator.

U.S. Pat. No. 3,765,020 discloses a technique for overcoming the aforementioned disadvantages of a digitally controlled attenuator. In particular, means are provided for coupling a first portion of the radio frequency signals to a compensator and a second portion thereof to a radio frequency bus. The radio frequency bus has connected thereto, at predetermined points, a plurality of switching and coupling networks, each one thereof used for coupling, in proper phase relationship, a part of the second portion of the radio frequency signals to a shunt element of a ladder network in accordance with a digital control signal. The output of the ladder network and the output of the compensator are combined in a manner such that any unwanted signals passing through the switching networks are effectively cancelled.

Although ths patent purports to correct the deficiencies attendant with the use of digital attenuators, use of such digital attenuators still have serious disadvantages. In particular, high levels of switching noise are present in the system and compensation means are required for the phase shift effects.

U.S. Pat. No. 4,106,872 discloses a technique for measuring cloud altitude in which the sensitivity of a receiver for detecting echo signals from the clouds is controlled to adjust the receiver for detection of only clouds, not haze, for example. A repetitive waveform is read out of a ROM with range and the output is converted to generate a specified waveform which in turn is utilized to adjust the sensitivity of a level sensing unit. A technique for adjusting the ROM output waveform to meet various operating requirements is not disclosed however.

Additional disadvantages of prior art STC circuits are as follows:

(1) Piecewise approximations to $R^{-4}$, $R^{-3}$, etc., range attenuation profiles are utilized and are inherently inaccurate at points across the dynamic range.

(2) STC is provided by control of FET gate voltage, transistor emitter current, or vacuum tube grid voltage, using several stages to achieve the full STC dynamic range.

(3) The control parameter is linear over some dynamic range, with "knee points" which vary from device to device, thus unduly complicating matching to the piecewise approximation of $R^{-4}$, etc., curves.

(4) The piecewise-approximate STC curves are extremely unwieldy for slope changeover (e.g. $R^{-4}$ to $R^{-3}$) on a dynamic basis.

(5) The piecewise-approximate STC curves are also unwieldy for STC range end-point changeover on a dynamic basis. This is a substantial impediment with power-programmed radars where STC range end-point needs to change dynamically, group-to-group.

The prior art digitally programmed electronic attenuators set forth hereinabove have additional disadvantages including excess insertion loss. Due to the nature of the circuitry, the residual insertion loss tends to increase on a per-bit basis. A 6-bit digital attenuator at S-band has a specification of 0.6 to 0.7 db per bit, or 3.6 to 4.2 dB residual insertion loss. Further, these attenuators generally reconvert to analog voltage for control of a single analog attenuating circuit.

What is desired is to provide simplified apparatus for modifying the STC end point or STC slope without requiring access to large memory capacity devices, the added memory greatly increasing STC cost.

SUMMARY OF THE PRESENT INVENTION

The present invention provides for precision control of RF attenuators in two STC configurations, each configuration utilizing a log-scale electronic attenuator (controllable absorptive modulation). The first configuration includes a D/A converter/linear-to-log module combination to provide a log range ramp; the second configuration utilizes a log table ROM/D-A converter to provide a precision log range ramp, the range so generated controlling a log-scale electronic attenuator utilized in the radio frequency receiver.

It is an object of the present invention to provide an improved log-scale linearized attenuator adapted for use with radio frequency signals.

It is a further object of the present invention to provide an accurate ramp control signal for use in radar systems by utilizing a log table ROM or D-A converter/linear-to-log module configuration.

It is still a further object of the present invention to develop a mathematically exact range slope curve of any real number, including non-integers, from a single logarithmic ramp for use in a search radar system.

It is an object of the present invention to provide an improved STC configuration which may be utilized with any pulsed radar system which is relatively simple, inexpensive and which can be easily adapted to various radar detection requirements.

BRIEF DESCRIPTION OF THE DRAWING

For a better understanding of the invention as well as other objects and further features thereof, reference is made to the following description which is to be read in conjunction with the drawing wherein.

DETAILED DESCRIPTION

Figure 1:
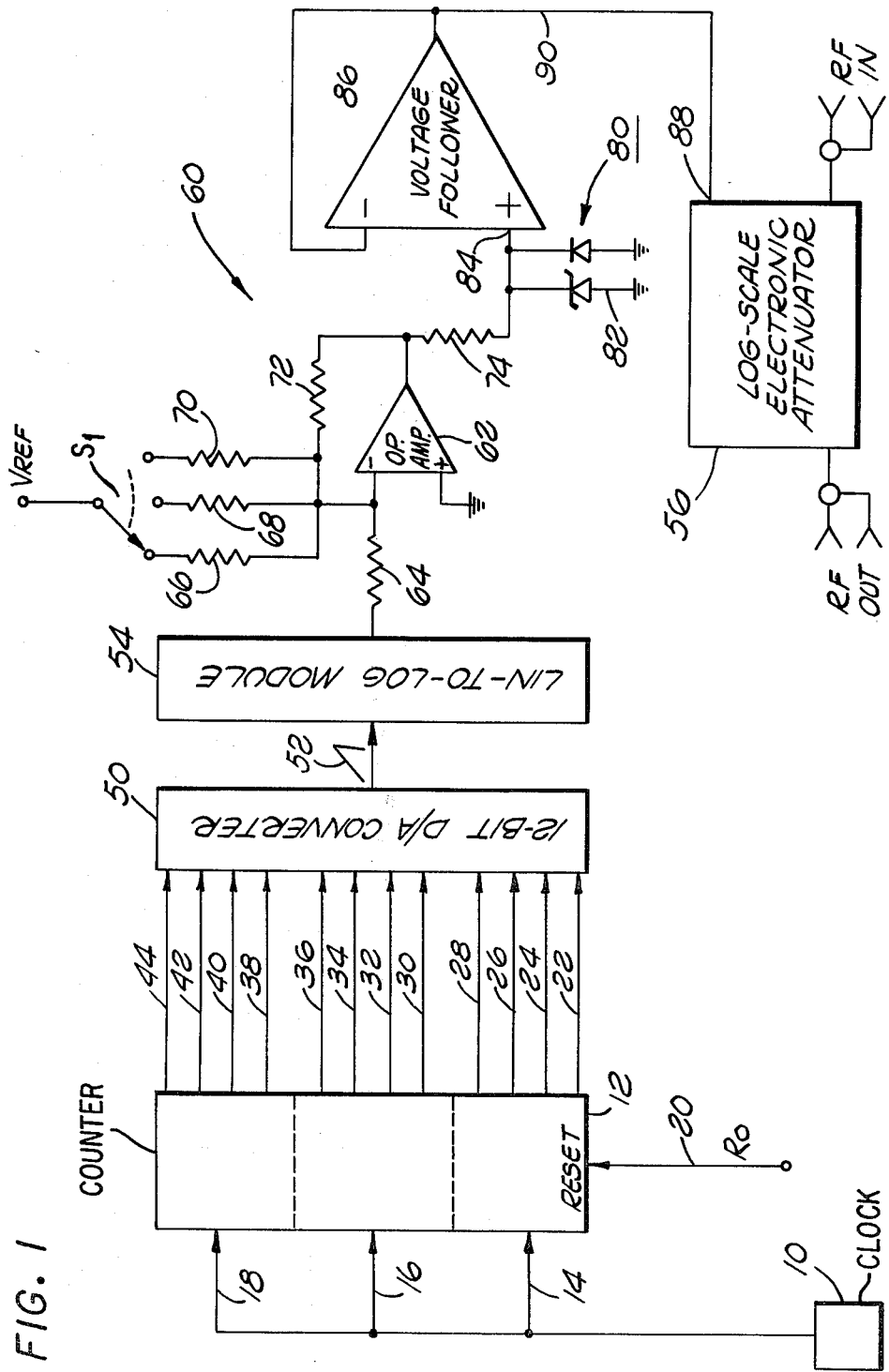
FIG. 1 is a block diagram of one embodiment of a precision controlled RF attenuator in accordance with the teachings of the present invention.
Figure 4:
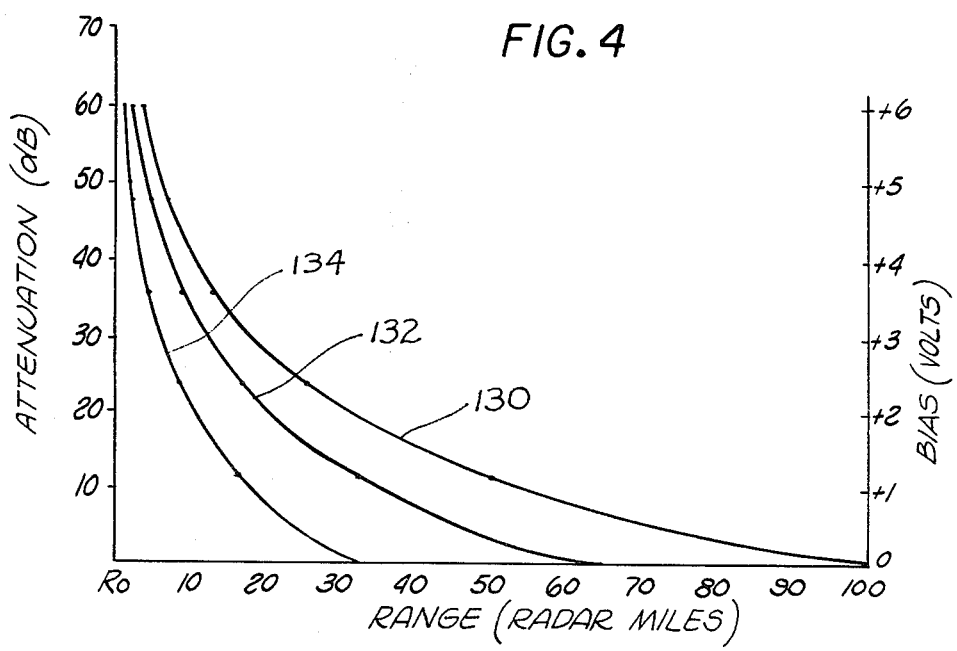
FIG. 4 is a set of curves of log attenuation mode versus radar range with variable STC end points.

Referring to FIG. 1, a block diagram of the first embodiment of the present invention is illustrated. A clock 10 applies system clock pulses at a rate of approximately 655 KHz to a 12-bit binary range counter 12 over leads 14, 16 and 18. Counter 12 is a cascade of three 4-bit counters, carry pulses activating each successive counter in the cascade in the conventional manner. The count is initiated after a radar pulse is transmitted via a range zero ($R_o$) pulse received on lead 20 from an external source. If it is assumed that each clock pulse corresponds to $\frac{1}{8}$ radar mile, counter 12 can count to 512 radar miles. Counter 12 is always reset to zero by pulse $R_o$ to start a new count on each listening period (period between successive radar transmit pulses). A typical counter which may be utilized is the 54163 available from National Semiconductor, Mountain View, California. The output of counter 12 appears on leads 22 (least significant bit), 24 ... 44 (most significant bit), and is coupled directly to high speed digital-to-analog (D/A) converter 50. Preferably, D/A converter 50 should have a settling time less than 500 ns and output wherein spikes which normally would occur on data pulse transitions are eliminated. A D/A converter manufactured by Analog Devices, Inc., Norwood, Massachusetts, Model MDA 10F or DAC08, may be utilized as D/A converter 50. The output of D/A converter 50 is a linear range ramp 52 which corresponds to the propagation return time of the radar energy. The output signal 52 from D/A converter 50 is coupled to a linear-to-log function device 54, such a Model No. 775 N also manufactured by Analog Devices, Inc. This particular device uses a transistor base-to-emitter junction in a compensated operational amplifier feedback circuit to generate the log of the analog input function (converts voltage to log current lines). The log function, a log range analog ramp, is a continuous function (the inverse of this function is shown in FIG. 4).

Figure 2:
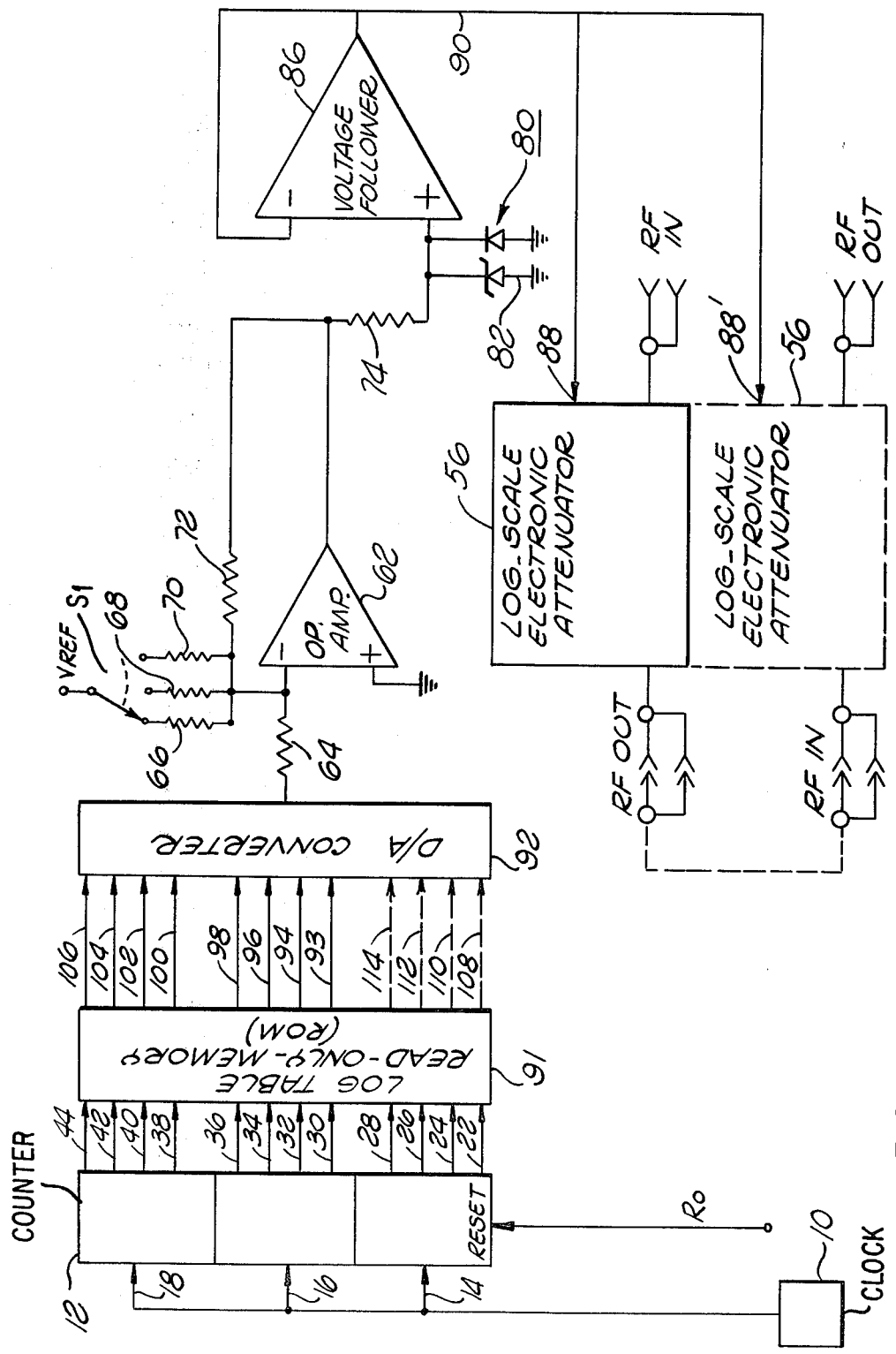
FIG. 2 is a block diagram of a second and preferred embodiment of a precision controlled RF attenuator in accordance with the teachings of the present invention.

The log range analog ramp signal is coupled to electronic attenuator 56 via switching means 60, the latter to be described in more detail hereinbelow. In the embodiments of FIGS. 1 and 2, wherein 60 dB attenuation range is required for 0.75 dB maximum insertion loss, attenuator 56 may be a commercially available S-band RF attenuator such as the Model D 1952 made by General Microwave Corporation, Farmingdale, New York. This attenuator is an absorptive PIN diode modulator/driver having good analog control voltage linearity on the logarithmic scale of attenuation. The Model D1952 device can be modified, if necessary, to extend the dB attenuation range.

Switching means 60 comprises an operational amplifier 62, such as the 747 Model manufactured by National Semiconductor, and associated resistors 64, 66 ... 74 connected to invert the input applied thereto. It should be noted at this point that most STC configurations are designed to linearly approximate a $R^{-4}$ range vs attenuation response to match two-way radar losses. However, for some radar applications (such as discriminating chaff), a $R^{-3}$ or $R^{-2}$ response would be more appropriate. The particular configurations shown in FIG. 1 (and FIG. 2) will generate any desired real STC profile versus range by simply changing the ($R_{72}/R_{64}$) ratio (ratio of the impedance values for the noted resistors). In fact, the ($R_{72}/R_{64}$) ratio is precisely the range response profile, i.e. ($R_{72}/R_{64}$)=3 for $R^{-3}$. Since this ratio is a continuous function, the range profile can be other than integers, and is infinitely adjustable to real values, i.e. $R^{-2.75}$ etc.

Furthermore, it is not necessary to modify the single analog range ramp generated from range counter 12 no matter what range profile is selected since the log range ramp is generated by counting clocks from time $R_o$. Therefore, the ramp is always identical (free of jitter) at any given range from sweep-to-sweep. It does not matter how much or how little of the range sweep is really utilized for any given step in the radar scan program since the ramp is precise at all points on the curve.

The STC configuration described is also universally adjustable for "STC End point." STC End point is defined as the point in range at which STC attenuation reaches 0 dB (and the output of operational amplifier 62 falls to 0 V DC). It is only necessary that reference voltage $V_{REF}$ be equal to $-\log R_{STC\ End\ point}$, if $R_{66}=R_{64}$. The said End Point is the range above-defined. If these resistors are not the same (the general case), then STC End point is set at the range where $$(-V_{REF}R_{72}/R_{66}) = (R_{72}/R_{64}) \log R_{STC\ End\ point}$$

This is more desirable since a single $V_{REF}$ can be used and the required STC End point is set by changing $R_{66}$. This is illustrated in FIG. 1 where a mechanical switch, S1, routes $V_{REF}$ to the amplifier 62 via $R_{66}$, $R_{68}$, or $R_{70}$. STC End point can be adjusted to any real range by adjusting $R_{66}$ and/or $V_{REF}$, on a continuous analog basis. In order to be compatible with commercially available logarithmic attenuators, (such as the D1952), the STA function must be bounded. At ranges beyond $R_{STC\ End\ point}$, the STC voltage is negative. The attenuation does not change below 0 V DC (i.e., 0 dB point). Typically, the attenuator will simply not respond further to negative bias (i.e., will remain at 0 dB attenuation). If there is a potential "damage" problem, then the bias voltage can be clamped by CR1 diode 80 to ground with current limiting by $R_{74}$ at the output of amplifier 62. In a like manner a 6 volt zener diode 82 clamps the upper bias range at +6 V DC for a 60 dB attenuator. The non-inverting input port 84 of a voltage follower operational amplifier 86, such as the LH0062D manufactured by National Semiconductor, is high impedance providing negligible voltage drop in $R_{74}$ when the output of amplifier 86 is between clamp points. Operational amplifier 86 provides low impedance drive to the STC attenuator control bias port 88 via lead 90, the output of amplifier 86 being shown in FIG. 4.

As shown in FIG. 4, upper bias range clamping holds constant maximum attenuation from $R_o$ out to some R where the $R^{-4}$ ($R^{-3}$, etc.) slope intersects 60 dB. The practice of accepting flat maximum attenuation out to a few miles is standard but this may be avoided by cascading two log-scale electronic attenuators as illustrated in the FIG. 2 embodiment. Control bias lines 88 and 88' are operated in parallel with RF ports in series. The gain factor, K of operational amplifier 62, would have to be cut in half to accommodate two attenuators with the same range slope as before (20 dB per volt with two attenuators cascaded). The cascade arrangement on the attenuators maintains a constant bias from $R_o$ to a point R where the $R^{-4}$ slope intersects 120 dB. Conceptually, this is the same as with one 60 dB attenuator but the 120 dB range is much closer in than the 60 dB range. For example, with a single 60 dB attenuator and a STC End point of 100 miles, the constant bias would extend out to 3.16 miles. For two 60 dB attenuators, the constant bias for the same STC End Point intersection is at 0.1 miles. Since each range clock has been assumed to be 0.125 mile, the 120 dB intersection is essentially at zero range.)

FIG. 2 illustrates an alternate embodiment of the present invention wherein the D/A converter 50 and linear-to-log device 54 of FIG. 1 is replaced with a log table read-only memory (ROM) 91 and D/A converter 92. The output of range counter 12 is coupled to ROM 91, the range count being the ROM address. The ROM looks up the log of integer numbers from 1 to 4096, the maximum range being included in the integer numbers. The output of ROM 91 is a digital binary word of 8 bits on leads 93, 94 ... 106, the number of bits used being dependent upon the log accuracy desired. Additional bits on leads 108, 110 ... 114 can be provided, if desired, for increased accuracy. The output of ROM 91 is coupled to D/A converter 92, similar to D/A converter 50 of FIG. 1. The output of D/A converter 92 is a highly precise logarithmic range, analog, ramp voltage. The circuitry following D/A converter 92 is identical to the circuitry described hereinabove with reference to FIG. 1. A typical ROM which may be utilized is the 82S191 available from National Semiconductor.

The RF output from attenuator 56 in both the FIG. 1 and FIG. 2 embodiments is preferably applied to the receiver low noise pre-amplifier (not shown) although it may be applied at other points in the receiver.

Figure 3:
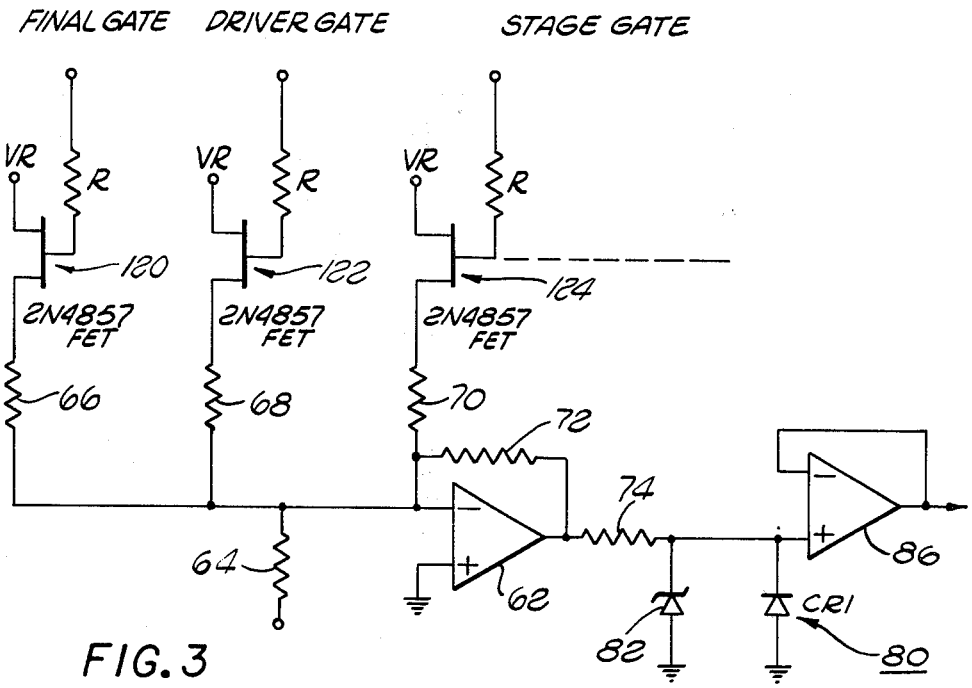
FIG. 3 illustrates electronic switching techniques which may be utilized in the FIG. 1 or FIG. 2 embodiment.

FIG. 3 shows an electronic circuit for varying $R_{STC\ End\ point}$ in a power-programmed radar scan (the radar transmitter power is programmed with scan elevation angle). For long ranges, the final (highest power) stage in the transmitter is energized and a system gate (not shown) turns on FET 120 in series with $R_{66}$, connecting $R_{66}$ to $V_{REF}$ (FIG. 1 or 2). At higher elevation angles, which require less range from the radar, only the driver stage of the transmitter is energized and a system gate turns on FET 122 in series with $R_{68}$, connecting $R_{68}$ to $V_{REF}$. The shortest range coverage calls for the energization of the transmitter second stage, a system gate turning on FET 124 in series with $R_{70}$, connecting $R_{70}$ to $V_{REF}$. The effect of turning the appropriate FET on is to move the STC End point in range, as required, to match the transmit power being used. Referring to FIG. 4 wherein a set of curves of log attenuation mode versus radar is plotted, curve 130 represents the situation where $R_{66}$ of FIG. 3 is gated on, curve 132 represents the situation where $R_{68}$ is gated on and 134 represents the situation where $R_{70}$ is gated on. The FET switches perform the same function as the mechanical switches shown in FIGS 1 and 2 but do the switching much faster (i.e. in microseconds) thereby allowing the STC End point to be changed on a pulse-to-pulse basis if required. If resistors $R_{66}$, $R_{68}$ and $R_{70}$ are selected in response to absolute dB RF power levels being radiated, then the receiver response in the STC region should be constant for fixed target cross-section. Other gates, identical in concept, can be supplied to tailor $R_{STC\ End\ point}$ to smaller targets.

In summary, the present invention provides, inter alia, the following advantages:

(1) By using a clocked range counter, the range ramp data is always precise and repetitive;
(2) The logarithmic ramp conversion can be made as accurately as desired in the log table ROM 91 and D-to-A-converter 50;
(3) A mathematically-exact range slope curve of any real value [$R^{-4}$, $R^{-3}$, $R^{-1}$, $R^{-3.7}$, $R^{-6}$, etc.] can be simply developed from one single logarithmic ramp;
(4) The STC curve slope may be programmed by switching the gain resistors $R_{64}$, or $R_{72}$; it can be adjusted with infinite resolution (i.e., not confined to integers);
(5) The STC curve range End point is simply controlled and can be gate/switched or made continuously adjustable with infinite resolution.
(6) It is compatible with any pulsed radar system where STC is used; it is compatible with any range slope or STC End point; and
(7) It is compatible in radar systems where STC is terminated in some residual fixed dB attenuation rather than 0 dB attenuation.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. In a pulsed radar system wherein radio frequency echo signals produced by various objects in response to each one of a series of transmitted pulses of radar energy are processed by a sensitivity-time control device in the receiver of said system, said sensitivity-time control device modulating the sensitivity of said receiver during the periods between successive ones of said transmitted pulses, the combination comprising:

counter means responsive to clock pulses applied thereto for producing a digital output signal, said counter means counting clock pulses during successive transmitted pulses;

means responsive to said digital output signal for producing an analog linear range ramp signal having an instantaneous amplitude proportional to the corresponding instantaneous number of pulses counted by said counter means;

means connected to the output of said linear ramp producing means for generating the log signal equivalent of said linear range signal, said log equivalent signal having a predetermined amplitude versus time characteristic;

means coupled to the output of said generating means for adjusting said signal characteristic; and attenuator means responsive to the output of said adjusting means for varying, in accordance with said adjusting means output, the attenuation of the radio frequency signals as such radio frequency signals pass therethrough.

2. The system as defined in claim 1, including means for resetting said counter means to zero upon transmission of each pulse of said series of transmtted pulses.

3. The system as defined in claim 1, including means whereby the range response profile of said log signal is adjustable.

4. The system as defined in claim 3, wherein said adjusting means comprises an operational amplifier having input and feedback resistors, the ratio of the impedance values of said feedback and input resistors being the desired range response profile.

5. The system as defined in claim 4, wherein the point in range at which the attenuation is 0 dB by causing the output of the operational amplifier to be zero volts is adjustable.

6. The system as defined in claim 5, further including voltage means coupled to one input of said operational amplifier via resistor means.

7. The system as defined in claim 6, wherein the 0 dB point is adjusted by varying the impedance value of said resistor means.

8. The system as defined in claim 6, wherein said resistor means comprises a plurality of resistors, selected ones of which are coupled to said operational amplifier input.

9. In a radar system wherein radio frequency signals produced by various objects in response to each one of a series of transmitted pulses of radar energy are processed by a sensitivity-time control device in the receiver of said system, said sensitivity-time control device modulating the level of input signal to said receiver during the time interval following a corresponding one of said transmitted pulses, the improvement comprising:

counter means responsive to clock pulses applied thereto for producing a digital output signal, said counter means counting said clock pulses during successive transmitted pulses;

memory means responsive to said counter digital output signal for producing a digital binary word which corresponds to the log of the output from said counter means;

generating means connected to the output of said memory means for generating a logarithmic range analog signal, aid logarithmic voltage having a predetermined characteristic;

means coupled to the output of said generating means for adjusting said signal characteristic; and attenuator means responsive to the output of said adjusting means for varying the attenuation of the radio frequency signals in accordance with said adjusting means output as such radio frequency signals pass therethrough.

10. The system as defined in claim 9 including means for resetting said counter means to zero upon each pulse in said series of transmitted pulses.

11. The system as defined in claim 10 wherein adjusting means are included whereby the range response profile of said logarithmic range analog signal is adjustable.

12. The system as defined in claim 11 wherein said adjusting means comprises an operational amplifier having input and feedback resistors, the ratio of the impedance values of said feedback and input resistors controlling the desired range response profile.

13. The system as defined in claim 12 wherein the point in range at which the attenuation is 0 dB, by causing the output of the operational amplifier to be zero volts, is adjustable.

14. The system as defined in claim 13 further including voltage means coupled to one input of said operational amplifier via resistor means.

15. The system as defined in claim 13 wherein the 0 dB point is adjusted by varying the impedance value of said resistor means.

16. The system as defined in claim 14 wherein said resistor means comprises a plurality of resistors, selected ones of which are coupled to said operational amplifier input.

17. A radar system which transmits pulsed radio frequency signals and receives radio frequency echo signals following said transmitted pulses in time, including a sensitivity-time control device operative on said received radio frequency signals to apply a varying attenuation within the receiving time period following each of said transmitted pulses, comprising:

first means responsive to a reset signal marking the beginning of each receiving period following each corresponding transmitter pulse and to a source of clock pulses for generating a digital word of progressively changing value during at least a portion of said receiving time period;

second means responsive to said first means digital word for generating an analog signal which is a logarithmic function of said progressive values of said digital word and including means for varying the rate of change of said analog signal; and third means in series with the radio frequency path conducting said received radio frequency signals, said third means being controllable to produce an RF attenuation which is a logarithmic function of said second means analog signal.

18. The circuit combination according to claim 17 in which said third means includes at least one absorptive modulator in series with said radio frequency path.

19. The circuit combination according to claim 17 in which said first means includes a digital counter providing said digital word of progressively changing value as a linear function of the number of said clock pulses counted, in which said second means comprises a read-only memory responsive to said first means digital word to generate a second digital word having a predetermined logarithmic amplitude profile, and including a digital-to-analog converter for converting said second digital word to a corresponding analog function.

* * * * *